United States Patent
Wolf et al.

(10) Patent No.: US 8,297,685 B2
(45) Date of Patent: Oct. 30, 2012

(54) AIR GUIDING DEVICE

(75) Inventors: Thomas Wolf, Riedstadt (DE); Bogdan Pentia, Ostfildern (DE); Timo Lemke, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/164,154

(22) Filed: Jun. 20, 2011

(65) Prior Publication Data
US 2012/0013146 A1    Jan. 19, 2012

(30) Foreign Application Priority Data
Jul. 16, 2010    (DE) .......................... 10 2010 036 442

(51) Int. Cl.
*B62D 63/02* (2006.01)
(52) U.S. Cl. ................ 296/180.3; 296/180.1; 296/180.2
(58) Field of Classification Search ...... 296/180.1–180.5
See application file for complete search history.

(56) References Cited

U.S. PATENT DOCUMENTS

| | | | | |
|---|---|---|---|---|
| 3,776,587 A * | 12/1973 | Oxlade | ...... | 296/180.5 |
| 4,119,339 A * | 10/1978 | Heimburger | ...... | 296/180.5 |
| 4,159,140 A * | 6/1979 | Chabot et al. | ...... | 296/180.5 |
| 4,262,953 A * | 4/1981 | McErlane | ...... | 296/180.4 |
| 4,284,302 A * | 8/1981 | Drews | ...... | 296/181.5 |
| 4,460,213 A * | 7/1984 | Janssen et al. | ...... | 296/180.5 |
| 4,489,806 A * | 12/1984 | Shimomura | ...... | 180/313 |
| 4,511,170 A * | 4/1985 | Sankrithi | ...... | 296/180.1 |
| 4,659,130 A * | 4/1987 | Dimora et al. | ...... | 296/180.1 |
| 4,770,457 A * | 9/1988 | Tomforde | ...... | 296/180.5 |
| 4,772,060 A * | 9/1988 | Kretschmer | ...... | 296/180.1 |
| 4,772,062 A * | 9/1988 | Janssen et al. | ...... | 296/180.5 |
| 4,810,021 A * | 3/1989 | Burst | ...... | 296/180.1 |
| 5,555,594 A * | 9/1996 | Maddalena | ...... | 296/180.1 |
| 5,692,796 A * | 12/1997 | Yamamoto et al. | ...... | 296/180.1 |
| 6,033,010 A * | 3/2000 | Preiss | ...... | 296/180.1 |
| 6,712,425 B2 * | 3/2004 | Brulhart | ...... | 296/180.1 |
| 6,719,359 B2 * | 4/2004 | Steinicke et al. | ...... | 296/180.1 |
| 7,380,869 B2 | 6/2008 | Nakaya | | |
| 2007/0182207 A1 * | 8/2007 | Nakaya | ...... | 296/180.1 |
| 2010/0156142 A1 * | 6/2010 | Sumitani et al. | ...... | 296/180.1 |
| 2011/0148143 A1 * | 6/2011 | Ondracek | ...... | 296/180.5 |

FOREIGN PATENT DOCUMENTS

| | | |
|---|---|---|
| DE | 197 05 268 | 8/1998 |
| DE | 10 2007 002 331 | 10/2007 |
| DE | 60 2004 003 756 | 10/2007 |
| EP | 2 039 595 | 3/2009 |

\* cited by examiner

*Primary Examiner* — Lori Lyjak
(74) *Attorney, Agent, or Firm* — Gerald E. Hespos; Michael J. Porco

(57) ABSTRACT

The air guiding device has one or more air guiding bodies. Each air guiding body has an elongate attachment that extends in the longitudinal direction of the vehicle that bulges in a convex manner, is composed of a flexible or soft-elastic material and is embodied in the form of a half shell having a lateral elongate opening and can be adjusted automatically in the driving condition from a rest position into an operative position, in which it can be lowered in the direction of the roadway. In the rest position, the air guiding body is arranged close to the undersurface and, in the operative position, the air guiding body is held in a lowered position relative to the undersurface.

8 Claims, 5 Drawing Sheets

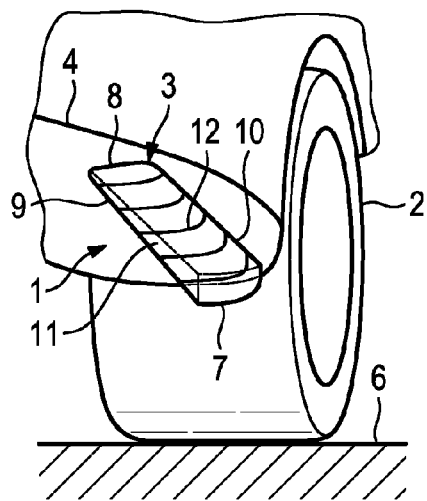
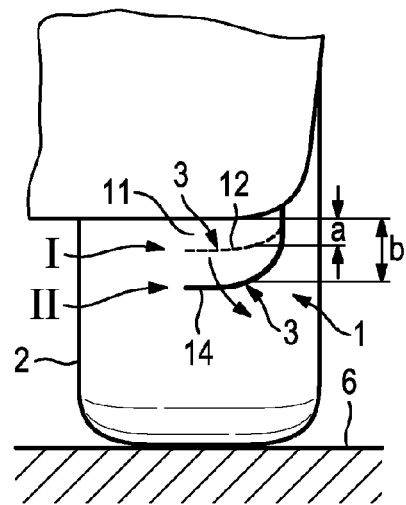
Fig. 1  Fig. 2
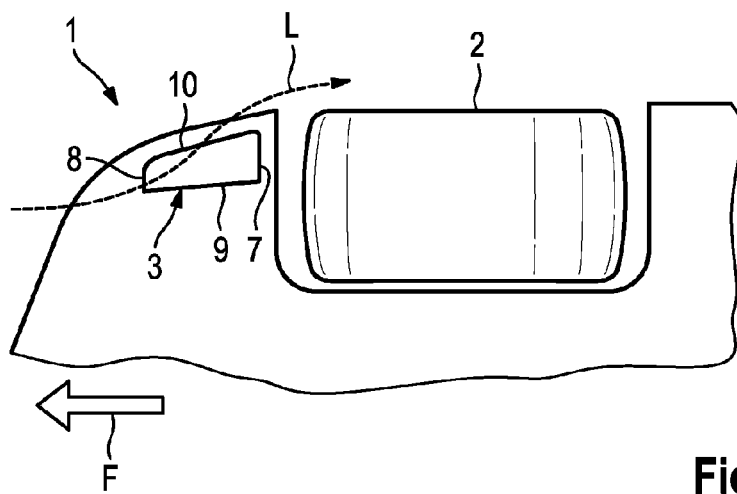
Fig. 3

AIR GUIDING DEVICE

CROSS REFERENCE TO RELATED APPLICATION

This application claims priority under 35 USC 119 to German Patent Application No 10 2010 036 442.8 filed on Jul. 16, 2010, the entire disclosure of which is incorporated herein by reference.

BACKGROUND OF THE INVENTION

1. Field of the Invention

The invention relates to an air guiding device.

2. Description of the Related Art

EP 2 039 595 A1 discloses an air guiding device for a vehicle with a wheel spoiler arranged in the area ahead of a vehicle wheel and projecting down in the direction of the roadway from the undersurface area of the vehicle. The air guiding device has a guide fin that adjoins the wheel spoiler and extends in a vertical plane approximately parallel to the direction of travel. An air flow is channeled in the areas of the wheels and the wheel arch.

It is the object of the invention to provide an air guiding device ahead of the wheels of a vehicle by means of which the aerodynamic properties of the vehicle are improved.

SUMMARY OF THE INVENTION

The invention relates to an air guiding device on an undersurface or on a front end part that reduces both air resistance and also lift on the vehicle. The air guiding device has an air guiding body automatically changes shape and adjusts as the speed of travel increases. More particularly, the air guiding body comprises an elongate attachment that extends in the longitudinal direction of the vehicle and comprises a flexible material. The air guiding body has a cross section in the form of a half shell with a lateral opening between the undersurface and the inner lateral edge of the air guiding body. The air guiding body can be adjusted automatically in the driving condition from a rest position into an operative position, in which it can be lowered in the direction of the roadway. In the rest position, the air guiding body has a bulging shape that arches continuously down and, in the lowered operative position, the air guiding body can be adjusted to a bulging shape that arches down continuously to a greater extent.

The air guiding body occupies the rest position when the vehicle is stationary or traveling slowly and the bulging shape that arches down is close to the undersurface. The air guiding body can be adjusted into the lowered operative position as the speed of travel increases and the bulging shape that arches down to a greater extent under the influence of an increasing vacuum in the area of the undersurface and forces resulting therefrom.

The air guiding device is in the rest position or shape when the vehicle is traveling slowly and is hardly visible, if at all, in this rest position. However, the air guiding device already is aerodynamically effective when the vehicle is traveling slowly. As the speed of travel increases, the air flowing outward from the center of the vehicle at the undersurface leads to an increasing vacuum on the side of the front wheels remote from the vehicle wheel. The resulting forces deform the air guiding device in a way that improves the aerodynamic effectiveness as the speed of travel increases. The air guiding device forms a bulging air guiding body in its optimum operative shape at high speed. More particularly, an air guiding body that is arched convexly down on the side remote from the vehicle wheel directs the air flow away from the vehicle wheel and thereby allowing a reduction both in air resistance and the lift of the vehicle. If the speed of travel is reduced again, the shape of the air guiding body changes back to the initial condition or rest condition by virtue of elastic restoring forces.

The air guiding body preferably has one or more offset tabs at an outer lateral edge and a front end edge. The tabs are held flexibly in slots on the undersurface. The inner lateral edge is opposite the outer lateral edge and is free of the undersurface to form the opening of the air guiding body in the form of a half shell. Thus, the inner lateral edge of the air guiding body is an air separation edge to ensure that the air guiding device can be adjusted from the rest position into the operative position and back again.

A rear end edge of the air guiding body preferably has an elastic fastening tab in the form of a u-shaped hook that can be hooked into slots in the undersurface. The hook allows deformation of the air guiding body into the operative position and is designed to produce restoring forces. The flexible attachment of the air guiding body by means of the individual tabs and by means of the elastic hook-shaped fastening tab allows deformation or adjustment of the air guiding body, and it is possible to produce restoring forces that return the air guiding body from the operative position to the rest position.

The air guiding body preferably tapers in a wedge shape to become narrower from the rear end edge to the front end edge. The inner lateral edge preferably extends in a shallow arc, and the opposite lateral edge preferably has a rectilinear shape profile. Other shape profiles for the lateral edges also are possible, according to circumstances. Thus, an aerodynamically favorably shaped body is formed, posing little air resistance to incident air and allowing air to be guided away from the wheels in an appropriate manner.

Two identical air guiding bodies preferably are arranged ahead of each vehicle wheel with the lateral openings of the air guiding bodies in the form of half shells lying opposite one another. The air guiding bodies preferably are parallel to one another and are separated by an interspace. One air guiding body preferably is close to the outside of the vehicle and the other air guiding body preferably is ahead of and as an extension of an inner wheel arch wall. An optimum aerodynamic effect is achieved since one air guiding body is as close as possible to the outer flank of the wheel, i.e. as far as possible at the outside of the bottom part of the front end. This effect can be enhanced further if the outer wheel flank facing the center of the vehicle also is covered by an air guiding body arranged in mirror-image fashion.

At the rear end, the air guiding bodies can be opposite and spaced apart from a transversely aligned spoiler element. The spoiler element consists of an attachment held vertically relative to the undersurface.

The air guiding bodies guide incident air around the vehicle wheels, preferably around the front wheels. This air guiding effect is achieved through the change in the shape of the air guiding body with increasing speed of travel due to forces acting at the undersurface, and the aerodynamic properties of the vehicle thus are improved. Moreover, there is no negative effect on either the appearance or ground clearance of the vehicle with the two air guiding bodies or the single air guiding body in the rest position.

An illustrative embodiment of the invention is depicted in the drawings and is described in greater detail below.

BRIEF DESCRIPTION OF THE DRAWINGS

FIG. 1 is a diagrammatic view of an air guiding body ahead of a vehicle wheel.

FIG. 2 is a front view of the air guiding body in a rest position and in a lowered operative position.

FIG. 3 is a view from below of an air guiding body with incident air flow.

DETAILED DESCRIPTION OF THE PREFERRED EMBODIMENTS

Figure 4:
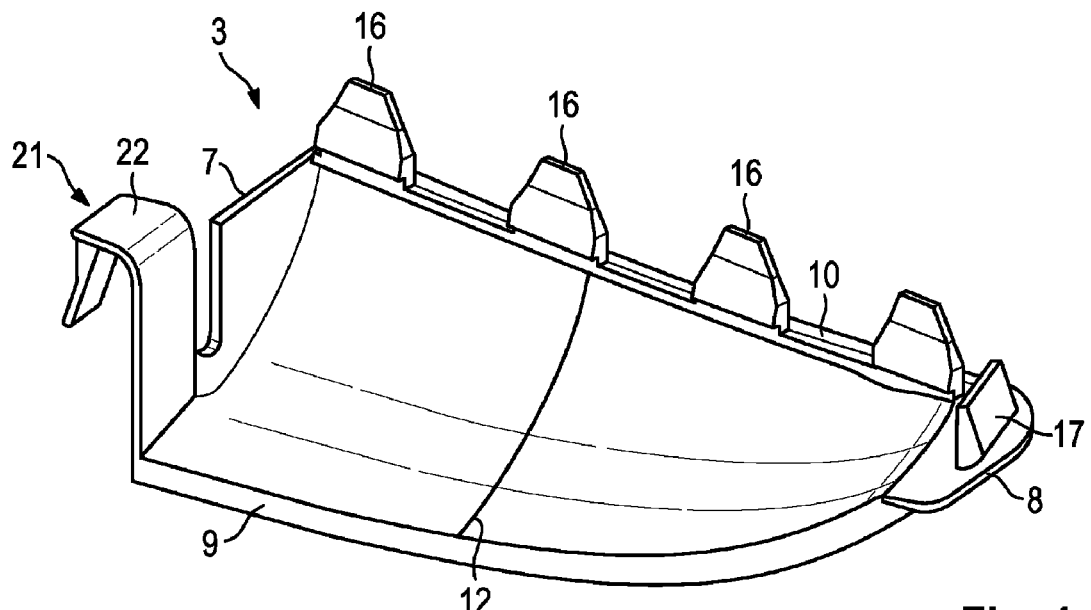
FIG. 4 is a plan view of the air guiding body.

An air guiding device 1, 1a on a vehicle is arranged in an area ahead of a vehicle wheel, preferably ahead of a front wheel 2. The air guiding device 1, 1a comprises an air guiding body 3 attached to an undersurface 4 of a wheel arch or to a front end part 5 and projects in the direction of a roadway 6.

The air guiding body 3 is an elongate attachment extending in the longitudinal direction of the vehicle and is made of a flexible or soft-elastic material that allows a change in shape and adjustment of the air guiding body 3. The air guiding body 3 is in the form of a half shell and, in the driving condition, can be adjusted automatically from a rest position I into a lowered, operative position II, as shown schematically by FIG. 2.

The air guiding body 3 is tapered in a wedge shape to become narrower from a rear end 7 to a front end 8. An inner lateral edge 9 extends in a shallow arc, and the opposite lateral edge 10, which is situated on the outside, has a rectilinear shape profile, as can be seen, in particular, in FIGS. 4 and 5. The shape profiles of the lateral edges can be chosen in accordance with circumstances.

Figure 5:
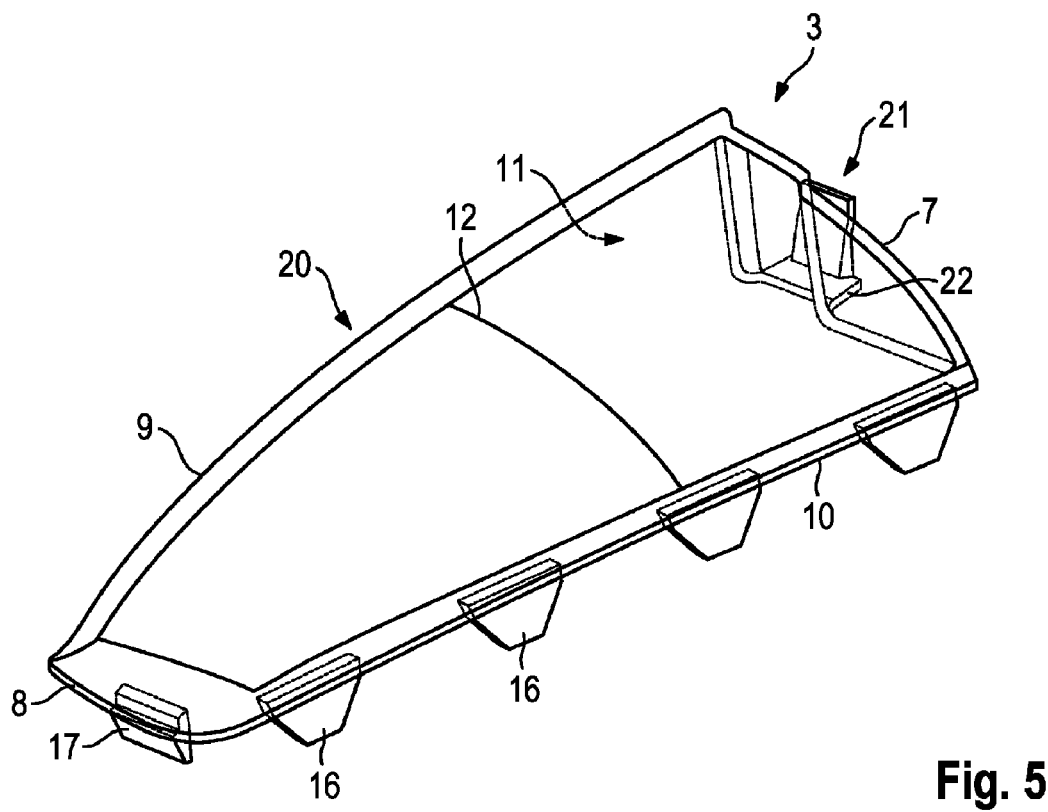
FIG. 5 is an oblique view of the air guiding body from below.
Figure 6:
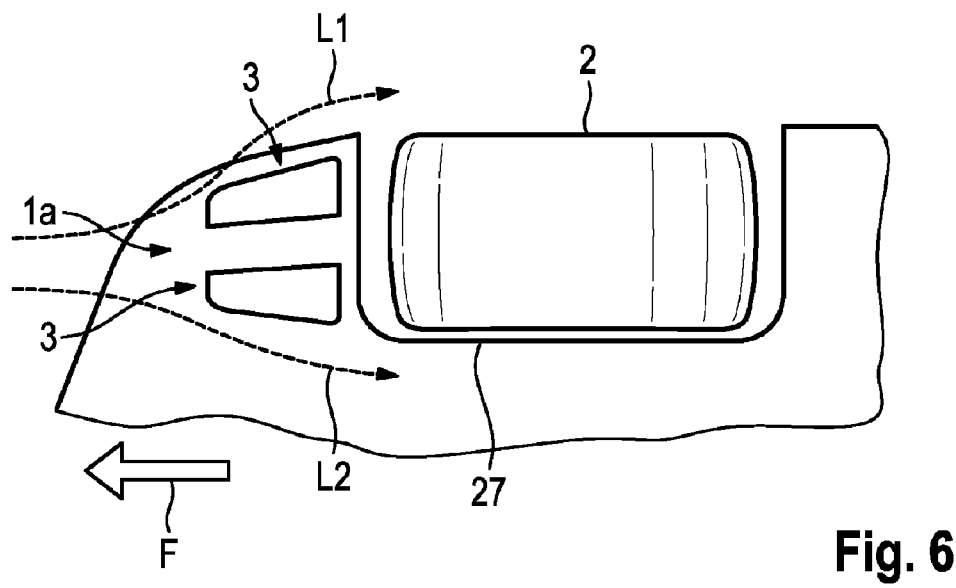
FIG. 6 is a view from below of two air guiding bodies arranged adjacent to one another ahead of the vehicle wheel.
Figure 7:
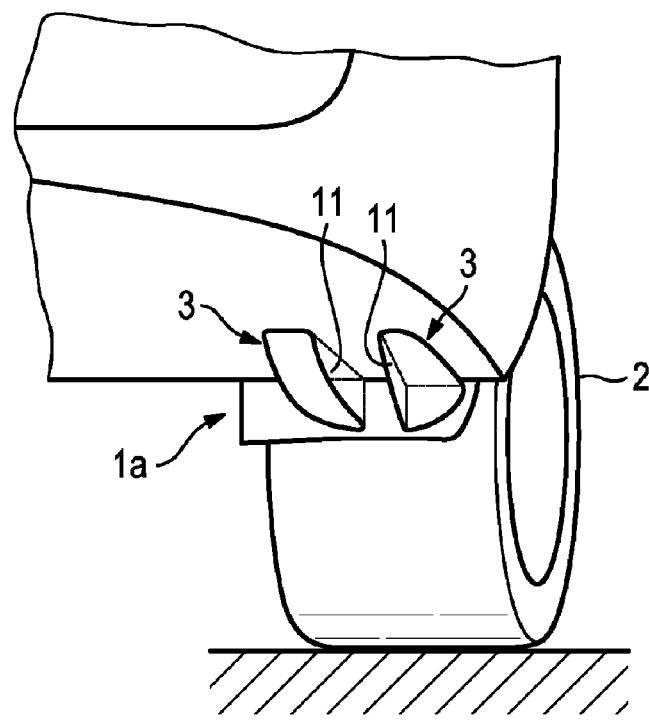
FIG. 7 is a diagrammatic representation of the two air guiding bodies of FIG. 6.
Figure 8:
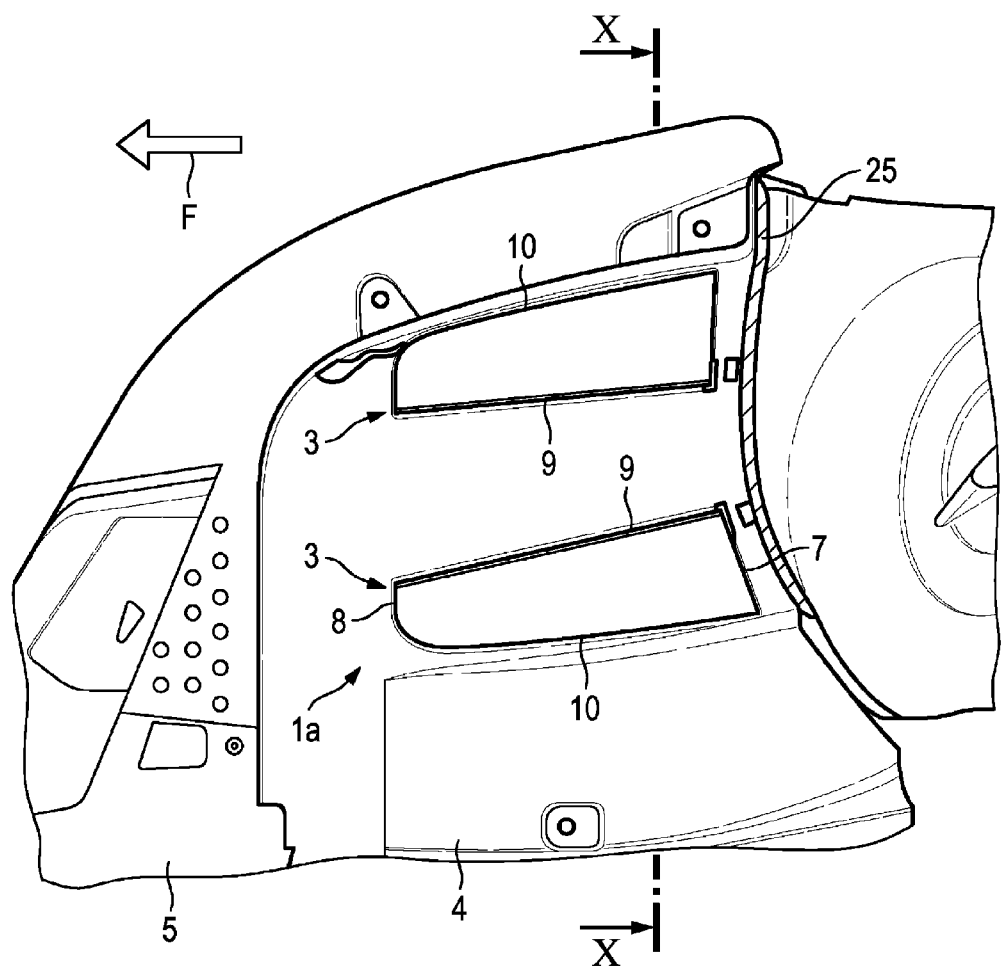
FIG. 8 is a view from below of the two air guiding bodies attached to the undersurface of the wheel arch.
Figure 10:
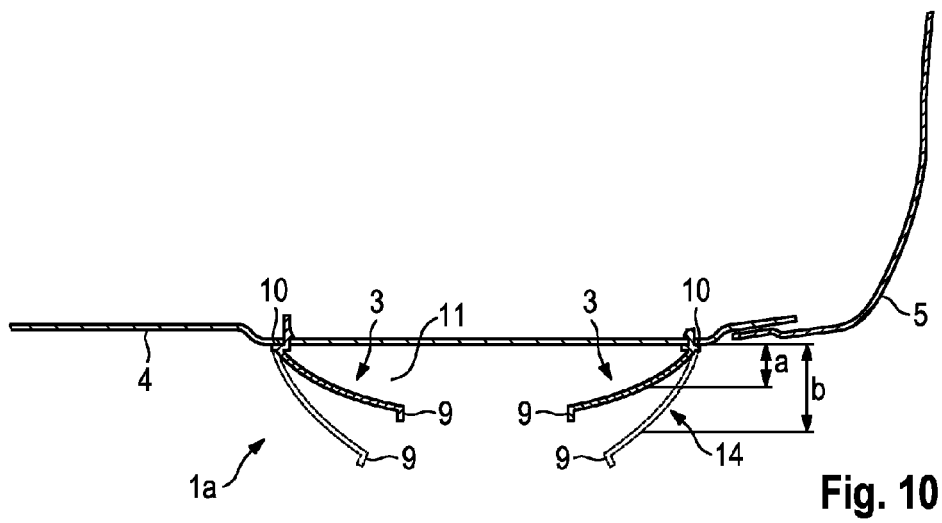
FIG. 10 is a section through the air guiding body and the undersurface along the line X-X in FIG. 8

In the rest position I, the air guiding body 3 has an arched bulging shape directed down toward the roadway 6 between the inner and outer lateral edges 9 and 10, as shown by the shape line 12 extending transverse to the vehicle in FIGS. 1 and 5. In the operative position II, the air guiding body 3 has a bulging shape 14 that arches downward to a greater extent, as shown more clearly in FIGS. 2 and 10.

When the vehicle is stationary or traveling slowly, the air guiding body 3 occupies the rest position I, in which it is at a short distance "a" from the undersurface 4 with a shape that arches downward. As the speed of travel increases, the air guiding body 3 adopts a bulging shape 14 arching downward to a greater extent, at a distance "b" from the undersurface 4.

Adjustment of the air guiding body 3 to the bulging shape 14 that arches to a greater extent is enabled by the mounting on the undersurface 4. More particularly, offset elastic tabs 16, 17 are disposed along the outer lateral edge 10 and the front end edge 8 and engage in slots in the undersurface 4. The opposite inner lateral edge 9, on the other hand, is free of and at a distance from the undersurface 4 and forms an elongate and inner opening 11. The inner lateral edge 9 is a boundary edge for the opening 4 and simultaneously is an air separation edge 20 that reduces the flow pressure on the vehicle wheel and hence the air resistance of the wheel in an optimum manner.

Figure 9:
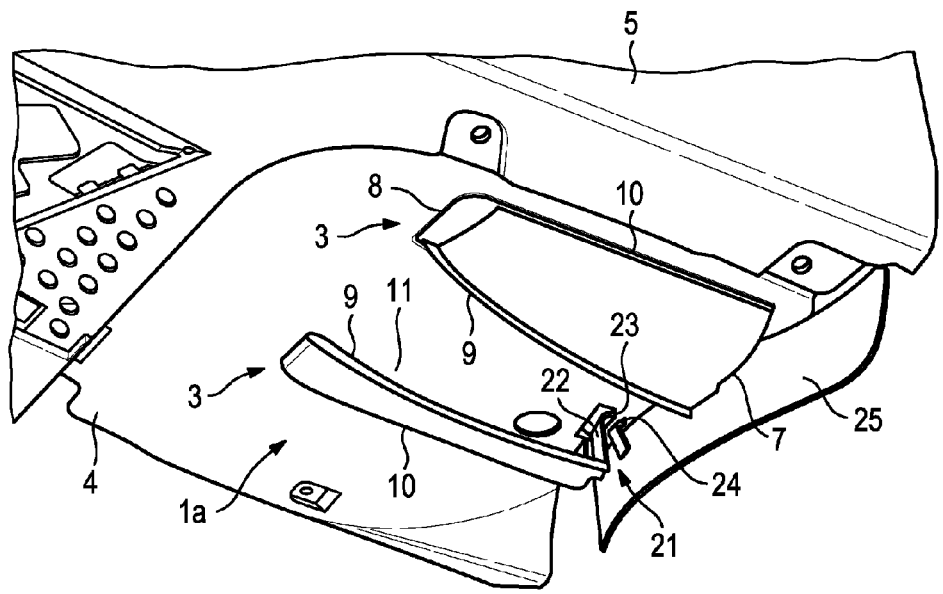
FIG. 9 is a diagrammatic representation of FIG. 8 with a transverse spoiler element ahead of a vehicle wheel.

The rear end edge 7 is connected to the undersurface 4 by an elastic fastening tab 21 for deformation of the air guiding body 3 into the operative position II. This fastening tab 21 consists of a u-shaped hook 22 that can be hooked into slots 23, 24 in the undersurface (FIG. 9).

According to another embodiment (FIGS. 6 to 10), each vehicle wheel 2 is assigned two identical air guiding bodies 3 of the air guiding device 1a. The air guiding bodies are situated opposite and parallel to one another, at a distance, with the elongate openings 11 lying opposite one another.

The rear ends 7 of the air guiding body 3 of the air guiding device 1 can be situated opposite and at a distance from a transversely aligned spoiler element 25, and it is also possible for the spoiler element 25 to be provided in the embodiment having one air guiding body 3 of the air guiding device 1a. The spoiler element 25 is aligned transversely to the vehicle and arranged vertically relative to the undersurface 4, and is positioned ahead of the wheel 2 and has an arcuate profile that allows the air flow to be diverted inward and outward.

As can be seen more clearly from FIG. 3, the air L is guided to the outside of the wheel in the operative position II by virtue of the fact that the air guiding body 3 of the air guiding device 1; 1a arches downward to a greater extent, and turbulence in front of the vehicle wheel 2 is thus avoided. The air L1 and L2 likewise is diverted outward and inward by the air guiding bodies 3 in the further embodiment of the air guiding device 1a, thus avoiding direct air flow to the wheel 2.

What is claimed is:

1. An air guiding device for a vehicle arranged in an area ahead of wheels of the vehicle and projecting down toward the roadway from an undersurface of a wheel arch shell or a front end part, the air guiding device comprising air guiding bodies, each of the air guiding bodies of the air guiding device comprising an elongate attachment that extends in a longitudinal direction of the vehicle, the elongated attachment being made of a flexible material and having a cross section in the form of a half shell having a lateral elongate opening between an undersurface and a lateral edge of the air guiding body, the air guiding bodies being oriented so that the lateral openings face toward one another and toward a center of the vehicle, the air guiding bodies being adjusted automatically in accordance with a driving condition from a rest position at the undersurface into an operative position, in which the air guiding body is lowered toward the roadway.

2. The air guiding device of claim 1, wherein in the rest position, the air guiding body has a continuous bulging shape that arches down and, in the lowered operative position the air guiding body is adjusted to a continuous bulging shape that arches downward to a greater extent.

3. The air guiding device of claim 2, wherein when the vehicle is stationary or traveling slowly, the air guiding body occupies the rest position and the bulging shape that arches downward is close to the undersurface, with the dimension, and, as the speed of travel increases, the air guiding body can be adjusted into the lowered, operative position with the continuous bulging shape that arches downward to a greater extent, with the dimension, under the influence of an increasing vacuum in the area of the undersurface and the forces resulting therefrom.

4. An air guiding device for a vehicle arranged in an area ahead of at least one wheel of the vehicle and projecting down toward the roadway from an undersurface of a wheel arch shell or a front end part, the air guiding device comprising at least one elongated air guiding body that extends substantially in a longitudinal direction of the vehicle, the air guiding body being made of a flexible material, and being held flexibly on the undersurface at an outer lateral edge and a front end edge by one or more offset tabs in slots in the undersurface, and an inner lateral edge situated opposite the outer lateral edge being free of the undersurface to form an opening so that the air guiding body defines a half shell with the inner lateral edge defining an air separation edge, the air guiding body having a continuous bulging shape that arches down when the vehicle is at rest and bulging down farther at increasing speeds of the vehicle due to an increasing vacuum in proximity to the undersurface and the forces resulting therefrom so that the shape of the air guiding body is adjusted automatically in accordance with vehicle speed.

5. The air guiding device of claim 4, wherein a rear end edge of the air guiding body has an elastic fastening tab defining a u-shaped hook hooked into slots in the undersurface, the hook being configured to allow deformation of the air guiding body and to produce restoring forces.

6. The air guiding device of claim 1, wherein the air guiding body tapers in a wedge shape to become narrower from the rear end to the front end when viewed in a direction of travel and the inner lateral edge extends, in a shallow arc or in a straight line, and the opposite lateral edge has a rectilinear or slightly arcuate shape profile.

7. An air guiding device for a vehicle arranged in an area ahead of a vehicle wheel and projecting down toward the roadway from an undersurface of a wheel arch shell or a front end part, the air guiding device having two identical air guiding bodies arranged ahead of each vehicle wheel, each of the air guiding bodies of the air guiding device comprising an elongate attachment that extends in a longitudinal direction of the vehicle, the elongated attachment being made of a flexible material and having a cross section in the form of a half shell having a lateral elongate opening between an undersurface and a lateral edge of the air guiding body, the lateral openings of the air guiding bodies in the form of half shells lying opposite one another and the air guiding bodies being arranged parallel to one another and being separated by an interspace, the air guiding bodies being adjusted automatically in accordance with a driving condition from a rest position at the undersurface into an operative position, in which the air guiding body is lowered toward the roadway.

8. The air guiding device of claim 1, wherein rear ends of the air guiding bodies are situated opposite and spaced apart from a spoiler element aligned transversely to the vehicle, and the spoiler element extends vertically from the undersurface in the direction of the roadway.

* * * * *